March 21, 1933.  A. MUSSO  1,902,090
PROCESS OF LOW TEMPERATURE REDUCED PRESSURE
OR PARTIAL VACUUM REDUCTION OF METALS
Filed Dec. 13, 1928
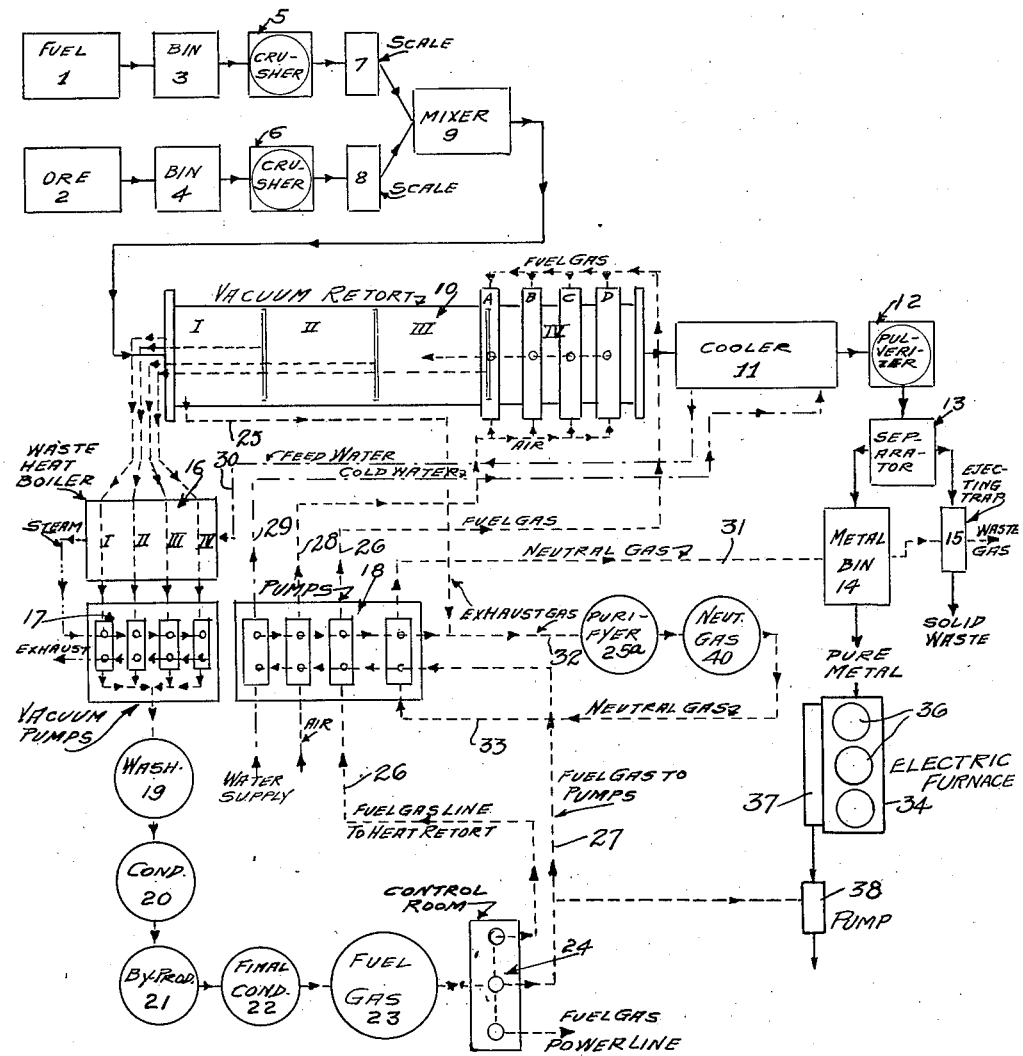

Patented Mar. 21, 1933

1,902,090

UNITED STATES PATENT OFFICE

ALFRED MUSSO, OF EAST ORANGE, NEW JERSEY, ASSIGNOR OF ONE-HALF TO WILLIAM P. DEPPE, OF NEW YORK, N. Y.

PROCESS OF LOW TEMPERATURE REDUCED PRESSURE OR PARTIAL VACUUM REDUCTION OF METALS

Application filed December 13, 1928. Serial No. 325,713.

This invention relates to processes of low temperature reduction of minerals of metals under conditions of decreased pressure, or partial vacuum, and the subsequent treatment of the metal produced, in a continuous process.

One object of this invention is to provide an improved process for reducing a metallic mineral, wherein the surface pressure at the mineral is decreased to facilitate escape or liberation and removal of the gaseous or volatile products and the temperature maintained below the point where the substantial pure metal produced may be blemished by contact with the gangue or similar constituents.

Another object of the invention is the provision of an improved low temperature process of the nature set forth, in which a rapid and substantially complete reduction of the mineral or a metal, particularly of iron, is effected by means of fixed preferably amorphous carbon under conditions of decreased pressure of the atmosphere of the reducing chamber, without melting or vaporization of the metal or iron.

A further object of this invention is to furnish an improved process of the type mentioned, wherein the gaseous and volatile products are forcibly removed from the reducing chamber, thus bringing about a rapid reduction of the mineral by solid carbon to obtain a substantially pure metal in an active nascent atmosphere but without any material gaseous reduction and the consequent retarding influences therewith associated.

A further object of the invention is to provide an improved low temperature direct and final reduction of a mineral to obtain a substantially pure metal wherein the volatile constituents and generated gases are rapidly removed in a plurality of stages, avoiding any substantial secondary reactions during the generation and removal of gases.

A further object of the invention is the provision of an improved process of low temperature reduction of a metal bearing mineral, in which the same is subjected to a constantly increasing temperature during the reduction process, and the gases rapidly removed from the scene of reduction in a plurality of separate streams.

A further object of the invention is to provide an improved process of the nature set forth that produces a fuel gas of a maximum heating value.

A further object of the invention is to provide an improved self-contained process in which a metal bearing mineral is reduced by means of fixed carbon of fuels or carbonaceous materials and gases are obtained having a high fuel value, which gases are used to generate the power necessary for operating all the various devices employed in the process.

A further object of the invention is to provide an improved process for the heat treatment of a metal, to the end that a uniform structure be obtained in the metal, this process contemplating a plurality of features, which can be used separately or collectively, among these features being, the heating of a molten metal to drive off occluded gases and positively and rapidly removing the occluded gases as they are liberated; the stirring of a metal that is being soaked to more rapidly liberate the occluded gases; and the continuous melting and soaking of a metal to refine the structure thereof.

This invention is an improvement and an elaboration and continuation of that set forth in my co-pending application for patent on processes of mineral reduction and metal extraction, Serial No. 208,103, filed July 25th, 1927. Reference may also be had to my co-pending apparatus application, Serial No. 259,406, filed March 16th, 1928, illustrating one device by means of which the process may be practiced.

Other objects and advantages of the invention will become apparent as the specification proceeds.

The process described herein constitutes one possible embodiment of the invention, the scope whereof is indicated in the following claims. On becoming conversant with the details of the invention, it will readily appear that the process is susceptible of various changes, that there resides basic novelty and utility in individual steps or features of the process, and that these can be used in whole or in part, and in different relations, according to the work that is to be done, or the results that are desired.

The drawing illustrates schematically the steps of the process, and the apparatus employed.

This invention provides for the reduction of the mineral by the fixed preferably amorphous carbon of coal, or other carbonaceous material, accompanied by a simultaneous rapid removal of the gaseous contents of the reduction chamber. By this process there is one direct and final reduction to obtain the substantially pure metal, from which the gangue may be removed by mechanical separation. Since the fixed carbon alone is used for reduction of the mineral, and the volatile gases removed, the latter are available in large quantities as fuel gas. The same is true of certain gaseous products of reaction, as, for instance, carbon monoxide, which has a high fuel value. Furthermore, secondary reactions of gases in the reducing chamber, will not, due to the rapid removal aforesaid, hinder the reduction of the mineral.

The temperatures of the reduction process are fairly low, i. e., the maximum temperatures for reduction of iron being approximately only 700° C. with coking coals, and 950° C. approximately with non-coking coals. These temperatures are only illustrative. However, other carbonaceaus materials or fuels may also be used. For metals other than iron, the aforesaid maximum temperatures will vary according to the nature of the mineral to be reduced. Generally, the maximum temperatures used in the process are below those of fusion and hence of sintering and agglomerating points of the substances received in the reducing chamber, so that carbides, or other metallic compounds will not thus be formed. It results therefore that the reactions are greatly simplified, and the use of flux rendered wholly unnecessary. The temperatures aforementioned represent those at the outlet of the reducing chamber. A suitable temperature gradient may be maintained diminishing toward the inlet of the reducing chamber.

The atmosphere of the reducing chamber is forcibly and constantly exhausted by any suitable means such as pumps. Preferably, this exhaustion is accomplished in a plurality of stages, that is, the gases are removed in a plurality of separate streams, thus minimizing reaction between the different gases. At the inlet end stage of the reducing chamber volatile gases are liberated, which constitute what is in the nature of a coal gas. Subsequently, illuminants, and other hydrocarbon gases, carbon monoxide, and hydrogen are formed and withdrawn in subsequent stages. The volumes of the gases increase with the temperature gradient, and from the inlet to the outlet of the reducing chamber. Since the gases that are removed in the end stages are hydrogen and carbon monoxide, which are purely reducing in their action with metals, there is absolutely nothing in the reducing chamber to blemish the metal. The reduction of the mineral is therefore simplified and hastened by this process, and the fuel value of the gases retained.

By rapidly forcibly removing the gaseous contents of the reducing chamber, the ambient pressure is decreased. Accordingly, the tension or outward pressure of the oxygen or other gases emanating from the mineral becomes higher than that of the ambient referred to. Hence the removal of the gases occurs as fast as generated, being approximately at or below the emanation pressures. Under these conditions of decreased ambient pressure, removal of gases and continuously applied heat, the coal is rapidly, thoroughly carbonized, and the fixed carbon of the fuel, which is preferably in an amorphous, highly active form, begins to volatilize. This serves to increase the rapidity of the reduction of the mineral particularly in view of the fact that the affinity of carbon for oxygen is greater than that of metals for oxygen. Due to the rapid removal of the oxides of carbon, a reverse action may not occur especially since the fixed carbon is greatly in excess. It may also be noted that the reduction by this process occurs in an atmosphere which is not only at a reduced pressure, but which is highly active in its movement through the interstices between the particles of the fuel and ore, and is of a nascent character. Reference is had to the volatile constituents of the coal or other materials that may be associated with the fixed carbon.

In ordinary furnace or retort practice, the gas pressure is always somewhat greater than atmospheric. In this invention, the decreased pressure or partial vacuum resulting from exhaustion of the gases, may therefore be below or slightly above atmospheric. Since this pressure may vary considerably, it is preferred not to specify any particular pressure, but rather to amplify the foregoing description, to indicate more fully the controlling factors and the relation of the temperatures thereto.

Because the interstitial spaces between the particles of material in the reducing chamber constitute practically a constant volume, the average pressure of the gases follows the gas law comparatively closely. Therefore the pressure is proportional to the temperature. The invention contemplates decreasing this pressure to the point where the reaction proceeds with the desired rapidity and economy. The reduction in pressure is readily achieved because there is a free space in the reducing chamber which is available to receive the gases and which, in volume, is many times the volume of the interstitial spaces; and furthermore, this free space is continuously exhausted. These factors may be properly coordinated to maintain a predetermined pressure in the ambient. Where a temperature gradient is maintained, the pressure may correspond to any point of the same, or a pressure gradient may be maintained of a negative slope with respect to that of the temperature gradient.

The materials that are treated in the reducing chamber consist of pieces which, to a large extent overlie one another. Thus the ambient pressure tends to become rather high, and to retard the liberation of the volatile gases and the sublimation of fixed carbon. To counteract this condition, the pressure in the furnace may be decreased to the extent desired. In this regard, it will be appreciated that the said materials may be constantly stirred, or otherwise arranged as in a thin stream having a large free surface so that the maximum surface of the fixed carbon or coal may be exposed per unit of time. Due to the considerable difference in pressure between the interstitial spaces and the free space of the reducing chamber, the nascent gases in the interstitial spaces have a high velocity, which quality may have an efficient relation to the solid carbon reduction, and produces eddy currents that stir the finely pulverized mass of mineral and fuel.

The reduction of the mineral occurs in a retort, in which there is no combustion whatever. Ordinary coal, as mined, may be used to supply the fixed carbon which is used for the reduction of the mineral. A typical ore that may be used herein is hematite, although it is contemplated that the invention may be used to obtain metals other than iron.

The basic character of this invention is intended to be indicated in part by the wide range of materials that may be employed therein. Thus among the minerals of metals and particularly iron, a few that may be used in the practise of the invention include the carbonates, and the hydroxides. But the minerals of metals other than iron may also be reduced by the process, including, for instance, those of nickel, copper, lead, silver, and other metals. Again, the fuels that may be used may vary greatly in character, and among them may be named anthracite, bituminous, semi-bituminous coals; lignites, peats, bogs, or similar kinds of hydrocarbons; wood, charcoal, and coke, oil shales, bituminous schists, and the like; and generally any material that contains a substantial amount of fixed carbon consistent with the conditions of this process.

On completion of the reduction process, a substantially pure iron is obtained which is supplied to an electric furnace. The latter has a melting hearth and a soaking trough through which the metal passes in continuously molten condition. In both the melting hearth and soaking trough, the metal is magnetically agitated, causing a release of occluded gases. The electric furnace, and more particularly, the soaking trough may be furnished with a pipe connection for positive exhaustion of the occluded gases as they are liberated, and to place the molten metal under decreased pressure. The electric furnace is more particularly described in my co-pending application, Serial No. 261,486, filed March 14th, 1928. Any other suitable melting furnace may also be used.

What has been stated above for iron is equally applicable to non-magnetic metals, except that, in the case of the latter mechanical stirring may be employed.

In the drawing, which is submitted to schematically illustrate one method of practicing the invention, 1 and 2 denote supplies of fuel and ore respectively, from which quantities thereof pass through bins 3 and 4, and thence into the crushers 5 and 6. Thereafter, suitable quantities by weight as determined on scales 7, 8, are passed into a mixer 9. The fuel and ore thus enters the rotary vacuum reduction retort 10 in intimately mixed condition, the materials having been pulverized, comparatively fine. The said retort, which is of a volume to provide an ample gas chamber above the charge, is divided by transverse walls into a plurality of compartments of any desired number, but preferably I, II, III, and IV. However, a retort with a single compartment may also be used. The compartment I receives the materials from the mixer 9, the solid contents being finally discharged from the compartment IV. The retort 10 is externally heated electrically or by a plurality of burners A, B, C, D disposed in any suitable manner, or in proximity to the compartment IV. These burners may be of any practicable type, and preferably consume fuel gas, the latter being either in premixed or stratified relation with the air supporting the combustion, according to the construction of the furnace. From the said burners, the products of combustion travel externally along the retort to the inlet end thereof, and are then discharged from the furnace as designated by the dotted line 25. Thus a temperature gradient decreasing toward the inlet of the retort is maintained.

In compartment I, methane and other constituents of coal gas are generated. In the next compartment, illuminants are volatilized, and in the last compartments, hydrogen is liberated, and carbon monoxide generated. This, however, is not to be construed in a limiting sense, but is intended to be merely illustrative. It is obvious to those skilled in the art that in large mass-production equipment, instead of having more than one compartment in a retort, it would be feasible, in commercial practice, to have several single chamber retorts in series and inter-communicating, in order to secure the stage-heating and extraction of the gases liberated and produced in this process.

The entire solid residue of the retort 10 passes into a cooler 11, having a water circulatory system. The material in the cooler is retained out of contact with air, and if desired, neutral atmosphere comprising carbon dioxide and nitrogen derived from the products of combustion of the burners may be supplied thereto. From the cooler 11, the solid residue enters a pulverizer 12, and thence a separator 13, that magnetically separates the metal from the other solid substances, the metal entering a metal bin 14, and the other substances passing through an ejecting trap 15, and being discharged as waste material. Neutral gas is furnished to the metal bin 14, and may be finally discharged into the atmosphere through the trap 15, depending on the construction of the latter. Where necessary neutral gases may be passed also into the pulverizer 12 and separator 13.

16 denotes a waste heat boiler having a plurality of sections I, II, III, IV separately communicating with the similarly designated compartments of the retort 10. One or more exhaust pumps 17 connected with the sections of the waste heat boiler 16 may be driven by engines utilizing the steam generated in the waste heat boiler. Where each compartment of the retort 10 has its individual pump, the exhaustion from the several compartments may be varied, in accordance with the quantities of gases generated therein, and other operating conditions, and the pressures in the compartments may be caused to decrease constantly toward the outlet end of the retort if desirable. From the pumps the retort gases pass into a washer 19, then into a condenser 20, a by-products collector 21, and a final condenser 22, and finally into a fuel gas tank 23. At 24 is indicated a control and distributing room, from which extends a fuel gas line 26 to heat the retort 10. A plurality of pumps 18 are provided, which are driven by any suitable means utilizing fuel gas supplied by a main 27 extending from the control room 24. One of these pumps 18 supplies fuel gas to the burners A, B, C, D of the retort 10 through the pipe 26, while the second pump supplies air for combustion to said burners through pipe 28. The first pump supplies cold water to the cooler 11, through a pipe 29, the water leaving the cooler entering the waste heat boiler 16 through a pipe 30. The fourth pump 18 supplies neutral gas through a pipe 31 to the metal bin 14 and to such other apparatus as may require it. The product of combustion formed in driving the pumps 18 as well as the waste gases of pipe 25 pass through a pipe 32 into a purifying tank 25a. In the purifying tank are removed water vapor and other condensible vapors contained in the products of gas combustion. From the purifying tank, the waste gas flows into a neutral gas tank 40, from which it is supplied by a pipe 33 to that one of the pumps 18 which discharges it through the pipe 31.

All of the units employed in the process may be operated by fuel gas generated in the system. Of course the heat content of the fuel gas may be transformed into electrical energy for convenient distribution. In any case, the crushers 5, 6, the mixer 9, the pulverizer 12, the separator 13, and the like, may be driven by the power thus centrally generated. Electrical energy may also be supplied to the electric furnace 34, hereinafter described.

Any suitable form or type of dust or tar traps may be provided between the gas outlets of the retort and the pumps forcibly exhausting the gases as fast as formed in the reducing retort.

It is seen that the system above described is self contained, since it generates all the fuel gas and power required to operate it. The excess of fuel gas may be supplied from the distributing room 24 to the main power line.

The electric furnace 34 may be used to make the metal into any desired grade of steel or alloy or other metal preferably in a neutral atmosphere, and out of contact of air and serves to refine the crystalline structure of the metal. The said furnace includes a plurality of melting hearths 36 from which the metal flows in a molten condition into a soaking trough 37. This flow occurs continuously, and as the metal is tapped from the soaking trough, additional metal being simultaneously supplied to the melting hearths from the bin 14. The metal in the electric furnace is agitated in any suitable manner, preferably magnetically, thus facilitating the liberation of occluded gases. A reduced pressure may be maintained in the soaking trough by means of a pump 38, thus causing a more rapid evolution of the occluded gases. In the melting hearth, any slag created may be removed, but the metal flows into the soaking trough from the bottom of the hearth, and is thus fit to be made into the highest grade of steel or other metal. The process is not to be limited by the construction or arrangement of the apparatus indicated, as the process may be practised with different types of apparatus, furnaces, and plant layouts, and entirely apart from the arrangement or features thereof shown or suggested therein.

By way of recapitulation, it is stated that according to the process of reduction and mechanical separation hereinbefore described, due to exhaustion of the gases in the retort and the use of neutral atmosphere in separating and heat treating the metal for making steel and alloys thereof, approximately a pure metal is obtained. The latter is directly available in the electric furnace for changing the metal into an alloy or high grade steel, or other metal of a substantially even crystalline structure.

The reduction process herein defined is a semi-direct process. The reduction of the ore is accomplished by the C itself, which is preferably in an amorphous condition, and the CO formed is available as fuel. The reactions are largely restricted to the decomposition of the oxide of iron, and to the formation of CO. The above holds equally true as regards the carbonate of iron. $H_2S$ and other gases are exhausted so that they may not attack the metal, nor react among themselves. This result is further aided by the stage exhaustion. The exhaustion of the gases may occur at any pressure lower than that which would obtain without rapid and forcible removal of the gases, and this pressure may even be considerably below atmospheric, and preferably as low as an improved furnace construction may permit. In certain instances the pressure may be reduced many pounds below atmospheric.

The process can be illustrated by the following reactions.

The reduction of ferric oxide is indicated by the following, (1) $Fe_2O_3 + 3C = 2Fe + 3CO$ This reaction is endothermic and reversible. No fusion occurs, under the increasing temperature gradient of the process, but the reaction leads to the simultaneous equilibriums indicated as follows:

(2) $Fe_2O_3 \rightarrow 2Fe + 3(\frac{1}{2}O_2)$
(3) $(\frac{1}{2}O_2) + C \leftarrow CO$ It will be appreciated that these equations are merely typical, and that they will vary with the mineral that is used.

The second equation indicates the decomposition of the ferric oxide, while the third shows the formation of CO. The two equilibriums referred to are caused, first, by the increased molecular velocity due to the rise in temperature and a concurrent lowered pressure or, partial vacuum and rapid exhaustion of gases; secondly, the presence of combining preferably highly active carbon in excess, at all times, due to the actual quantity of fuel admitted, and the continuous exhaustion of the gases from the retort during the reduction, and also the absence of atmospheric oxygen; and finally, the catalytic action of hot bodies including the retort walls.

The exhaustion of the retort gases in stages permits the oxygen of the hematite, if this be the mineral used, to come directly in contact with the fixed carbon of the fuel toward and during the last stages of the reduction, (where carbon monoxide, and hydrogen are obtained in large volumes), since, due to the lowered pressure or partial vacuum conditions, the amorphous carbon is at all stages prevented from absorbing or adsorbing gases of any kind, and since, in the last stage, which is the one in which there is a liberal volume of hydrogen generated, the carbon begins to volatilize in a substantial degree, and combines in the active atmosphere produced by the rapid exhaustion of gases, with the oxygen of the hematite under conditions of continuous equilibrium. The heating of the charge is external in the sense that no electrical currents are passed through the charge itself, which would cause sintering and agglomeration, so that the gangue would adhere to the metal and prevent separation of the latter without melting and consequent absorption of impurities.

The formation of carbon dioxide is avoided by the lowered pressure or partial vacuum conditions, by the excess of carbon that is always present, and the absence of air, together with the continuous forcible withdrawal of all gases as fast as formed. Because the reaction of carbon of the fuel with the nonmetallic portion of the ore, other than gangue, i. e., the oxygen from the hematite, above described, is a reversible reaction, and, furthermore, the result of such a reaction tends to an increase of pressure in the system, then the low pressure of the ambient, as established under the lowered pressure or partial vacuum conditions above described, by the well known principle of mobile equilibrium, will tend to make the equilibrium complete on the right hand side of the equations. Furthermore, in order to assure the completion of the equilibrium, an excess of carbon is supplied when the original ingredients are admitted to the retort.

By this process a high percentage of carbon monoxide is obtained, while the percentage of carbon dioxide is very low or nil. This is also due to the rapid exhaustion of the gases, among which is hydrogen which, if not removed, might act catalytically to convert carbon monoxide to carbon dioxide. Finally, it may be stated that because of the lower pressures or vacuum conditions, and increasing temperatures, the reaction velocities are very high, and the chemical equilibrium practically complete.

Owing to the basic nature of this process, it will be understood, that the applicant is not limited to any particular design or arrangement of apparatus for carrying out the process and providing the steps and conditions defined in this specification.

I claim:

1. A process of reducing with coal an ore of the group including the oxides, hydroxides, and carbonates of iron, to produce a substantially pure iron that can be mechanically separated from a non fused gangue, including externally heating the charge in successive closed chambers, in finely intermixed condition, in the absence of air, according to an increasing temperature gradient whose highest point is not in excess of 950° C., and simultaneously forcibly exhausting throughout the charge the gases generated, at pressures below atmospheric, according to a decreasing pressure gradient in said chambers, to cause the reduction to occur substantially entirely by means of the nascent amorphous carbon of the coal, through carbonization of the latter in the reducing chambers to produce said carbon.

2. An ore reduction process for directly producing a metal and gangue in non adherent unfused condition, including externally heating, in intimate contact, a coal and an ore of the group including the oxides, hydroxides, and carbonates of iron, in the absence of air, according to an increasing temperature gradient whose maximum is not in excess of 950° C., and simultaneously so exhausting throughout the charge, in separate streams, the different gases produced, at pressures below atmospheric, as to cause mainly a solid carbon reduction with substantially no carbon dioxide.

3. A process of treating and reducing in successive stages ores out of contact with air and extraneous gases to produce a substantially pure iron which can be separated from the gangue without melting, including externally heating a coal and an ore of the group including the oxides, hydroxides and carbonates of iron, in finely intermixed condition, according to an increasing temperature gradient whose maximum is not in excess of 950° C., and simultaneously removing in separate streams, the different gases produced at a decreasing pressure gradient below atmospheric pressure, while so loosely disposing the charge during the reducing stages as to promote the emission of gases throughout the same, whereby a reduction is effected substantially entirely by the solid carbon of the coal.

4. A process of reducing an ore whereby a metal is produced and separated from the gangue before melting, said process including heating to the reduction temperature a charge of a coal and an ore of the group including the oxides, hydroxides, and carbonates of iron, in finely mixed condition out of contact with air, the heating being external of the charge and sufficiently low to avoid fusion in the charge, the latter being so disposed during the heating as to facilitate emission of gases from the particles of the charge, and simultaneously removing all gases produced at a pressure below atmospheric, the reduction occurring in progressive stages according to corresponding increasing temperature and decreasing pressure gradients for the progressive stages, so that the reduction is substantially completed by the nascent amorphous carbon.

5. A process of treating and reducing ores out of contact with air and products of combustion, whereby substantially pure metal is produced and separated from the gangue before melting the metal, including so externally heating, to the reduction temperature, a fuel capable of producing amorphous carbon, in finely divided condition, mixed with finely crushed ore containing the oxides, hydroxides, and carbonates of metal capable of being substantially reduced by solid carbon reaction, so as to avoid any fusion of constituents of the charge, said heating being according to an increasing temperature gradient whose maximum is not in excess of 950° C., and simultaneously so forcibly continuously removing, by suction means all gases obtained as to avoid production of carbon dioxide, while so disposing the charge as to facilitate emission of gases therefrom, and the gases generated at different points of the temperature gradient being separately removed.

6. A process of treating and reducing iron bearing ores capable of being reduced by solid carbon reaction below melting points of solid materials in charge, out of contact with air and extraneous gases whereby finely divided particles of iron are produced and separated from the gangue, including externally heating to the reduction temperature, in closed chambers, a solid fuel capable of producing amorphous carbon and an ore in finely divided intermixed condition without fusion of the gangue, the heating being according to an increasing temperature gradient whose maximum is not in excess of 950° C., and simultaneously removing by suction means, all gases produced, under a decreasing pressure gradient whose lowest point is below atmospheric, whereby temperatures and emanation gas pressures are regulated and coordinated and reduction secured mainly by solid carbon reaction.

7. A process of treating and reducing ores out of contact with air whereby a substantially pure iron is produced and mechanically separated from the gangue, including externally heating, to the reduction temperature, a coal with an ore containing the oxides, hydroxides or carbonates of iron according to an increasing temperature, whose maximum is not in excess of 950° C., and simultaneously forcibly removing by pump means, all gases produced according to a decreasing pressure gradient to cause the reduction to occur substantially entirely by means of the carbon of the coal, while so disposing the charge as to render all the particles substantially subject to the said pressure gradient, and the removal of different gases generated at different points of the pressure gradient being separately effected.

8. A process of reducing an ore whereby a metal is produced and separated from the gangue before melting, including heating in finely mixed condition a coal capable of producing nascent amorphous carbon and an iron ore reducible by said carbon at a reduction temperature below 950° C., the heating being external of the charge and the latter being so disposed as to facilitate emission of gases from particles substantially throughout the charge, the temperature of heating being according to an increasing temperature gradient whose maximum is below the fusion point of the charge, and the gases being simultaneously withdrawn according to a corresponding decreasing pressure gradient below atmospheric pressure, sufficient to cause reduction of the ore by nascent amorphous carbon of the coal without gaseous reduction.

In testimony whereof I affix my signature.

ALFRED MUSSO.